(12) United States Patent
Pesola et al.

(10) Patent No.: US 11,553,490 B2
(45) Date of Patent: Jan. 10, 2023

(54) ACCESS CONTROL WITH PARTIAL SUPPORT FOR COMMUNICATIONS

(75) Inventors: Mikko Juhani Pesola, Marynummi (FI); Petri Juhani Vasenkari, Turku (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/266,058

(22) PCT Filed: Apr. 24, 2009

(86) PCT No.: PCT/EP2009/054982
§ 371 (c)(1),
(2), (4) Date: Oct. 24, 2011

(87) PCT Pub. No.: WO2010/121662
PCT Pub. Date: Oct. 28, 2010

(65) Prior Publication Data
US 2012/0046057 A1 Feb. 23, 2012

(51) Int. Cl.
*H04W 72/04* (2009.01)
*H04W 48/08* (2009.01)

(52) U.S. Cl.
CPC ................................ *H04W 72/048* (2013.01)

(58) Field of Classification Search
CPC . H04L 67/306; H04L 29/06; H04L 29/12009; H04L 61/00
USPC ... 455/553.1, 414.1, 554.1, 552.1, 444, 450, 455/451, 452.1, 525, 420, 509, 432.1
See application file for complete search history.

(56) References Cited

U.S. PATENT DOCUMENTS

| | | | | |
|---|---|---|---|---|
| 5,615,215 | A | * | 3/1997 | Utting et al. .................. 370/337 |
| 6,101,176 | A | * | 8/2000 | Honkasalo et al. .......... 370/335 |
| 7,072,652 | B2 | * | 7/2006 | Stephens ............... H04W 36/26 455/424 |
| 7,835,712 | B1 | * | 11/2010 | Shi ........................ H04W 48/16 455/161.1 |
| 8,139,537 | B2 | * | 3/2012 | Marks ...................... H04L 5/14 370/344 |

(Continued)

FOREIGN PATENT DOCUMENTS

| | | | | | |
|---|---|---|---|---|---|
| CN | 101060367 B | * | 11/2012 | ......... H04L 12/5695 |
| CN | 101926210 B | * | 11/2013 | ........ H04W 72/0486 |

(Continued)

OTHER PUBLICATIONS

3GPP TS 36.101 V8.5.0 (Mar. 2009) (Year: 2009).*

(Continued)

*Primary Examiner* — Mohammed Rachedine
(74) *Attorney, Agent, or Firm* — Mintz Levin Cohn Ferris Glovsky and Popeo, P.C.

(57) ABSTRACT

A control apparatus configured to allow a communication device supporting a first frequency setting to enter a system providing a communications facility based on a second frequency setting, wherein the first frequency setting provides only a partial support for communications in the system is disclosed. The control apparatus may be cooperative with a second control apparatus. The second control apparatus is configured to determine based on frequency setting information received from the system if it is possible to transmit to the system based on the first frequency setting supported by the communication device.

21 Claims, 3 Drawing Sheets

(56) References Cited

U.S. PATENT DOCUMENTS

| | | | |
|---|---|---|---|
| 8,923,267 B2* | 12/2014 | Soliman | H04W 76/14 455/518 |
| 2002/0197992 A1 | 12/2002 | Nizri et al. | |
| 2006/0105707 A1* | 5/2006 | Karabinis | B64G 1/1007 455/12.1 |
| 2006/0160538 A1 | 7/2006 | Hwang | |
| 2006/0205404 A1 | 9/2006 | Gonen et al. | |
| 2006/0252377 A1* | 11/2006 | Jeong | H04W 24/10 455/67.11 |
| 2007/0184834 A1 | 8/2007 | Jeong et al. | |
| 2007/0223574 A1 | 9/2007 | Roman et al. | |
| 2010/0081422 A1* | 4/2010 | Rofougaran | 455/420 |
| 2010/0081430 A1* | 4/2010 | Rofougaran | 455/426.1 |
| 2010/0111008 A1* | 5/2010 | Ishii | H04W 52/16 455/67.11 |
| 2010/0111088 A1* | 5/2010 | Olofsson | H04L 45/06 370/392 |
| 2010/0173667 A1* | 7/2010 | Hui | H04W 88/06 455/552.1 |
| 2010/0226295 A1* | 9/2010 | Sun | H04L 5/0007 370/294 |

FOREIGN PATENT DOCUMENTS

| | | | |
|---|---|---|---|
| CN | 104639226 A | * | 5/2015 |
| FR | 2876533 A1 | | 4/2006 |

OTHER PUBLICATIONS

Technical Specification 3rd Generation Partnership Project, Technical Specification Group Radio Access Network, Evolved Universal Terrestrial Radio Access (E-UTRA), User Equipment (UE) radio transmission and reception (Release 8), 3GPP, 3GPP TS 36.101, V8.5.1, Apr. 2009.

Technical Specification 3rd Generation Partnership Project, Technical Specification Group Radio Access Network, Evolved Universal Terrestrial Radio Access (E-UTRA) Radio Resource Control (RRC), Protocol specification (Release 8), 3GPP, 3GPP TS 36.331, V8.5.0, Mar. 2009.

Technical Specification 3rd Generation Partnership Project, Technical Specification Group Radio Access Network, Evolved Universal Terrestrial Radio Access (E-UTRA), User Equipment (UE) radio transmission and reception (Release 8), 3GPP, 3GPP TS 36.101, V8.5.1, Mar. 2009.

Technical Specification 3rd Generation Partnership Project, Technical Specification Group Radio Access Network, Evolved Universal Terrestrial Radio Access (E-UTRA) Radio Resource Control (RRC), Protocol specification (Release 8), 3GPP, 3GPP TS 36.331, V8.5.0, Apr. 2009.

"Some Further Aspects on the Harmonisation of the 800/850 Bands", TSG-RAN Working Group 4 (Radio) meeting #50, R4-091380, Ericsson, Agenda Item: 7.2, Mar. 23-27, 2009, 6 Pages.

"3rd Generation Partnership Project; Technical Specification Group Radio Access Network; Evolved Universal Terrestrial Radio Access (E-UTRA); User Equipment (UE) radio transmission and reception (Release 8)", 3GPP TS 36.101, v8.5.0, Mar. 2009, pp. 1-121.

"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331, v8.5.0, Mar. 2009, pp. 1-204.

International Search Report and Written Opinion received for corresponding Patent Cooperation Treaty Application No. PCT/EP2009/054982, dated Feb. 17, 2010, 15 pages.

"3rd Generation Partnership Project; Technical Specification Group Radio Access Network; Evolved Universal Terrestrial Radio Access (E-UTRA); User Equipment (UE) radio transmission and reception (Release 8)", 3GPP TS 36.101, V8.5.1, Mar. 2009, pp. 12-13 and 81-85.

"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331, v8.5.0, Mar. 2009, pp. 98-100.

Office Action received for corresponding Kazakhstan Patent Application No. 20111628.1, dated Jul. 3, 2012, 2 pages of Office Action and 2 pages of Office Action translation.

"LTE; Evolved Universal Terrestrial Radio Access (E-UTRA); User Equipment (UE) radio transmission and reception (3GPP TS 36.101 version 8.5.1 Release 8)", ETSI TS 136 101, v8.5.1, Apr. 2009, pp. 1-130.

3GPP, "UE radio access capability considering dual band operation with Band VI and Extended UMTS 800 Band for UTRA," NTT Docomo, 3GPP TSG-RAN WG4 Meeting #49bis, Ljulijana, Slovenia, Jan. 12-16, 2009, 2 Pages.

* cited by examiner

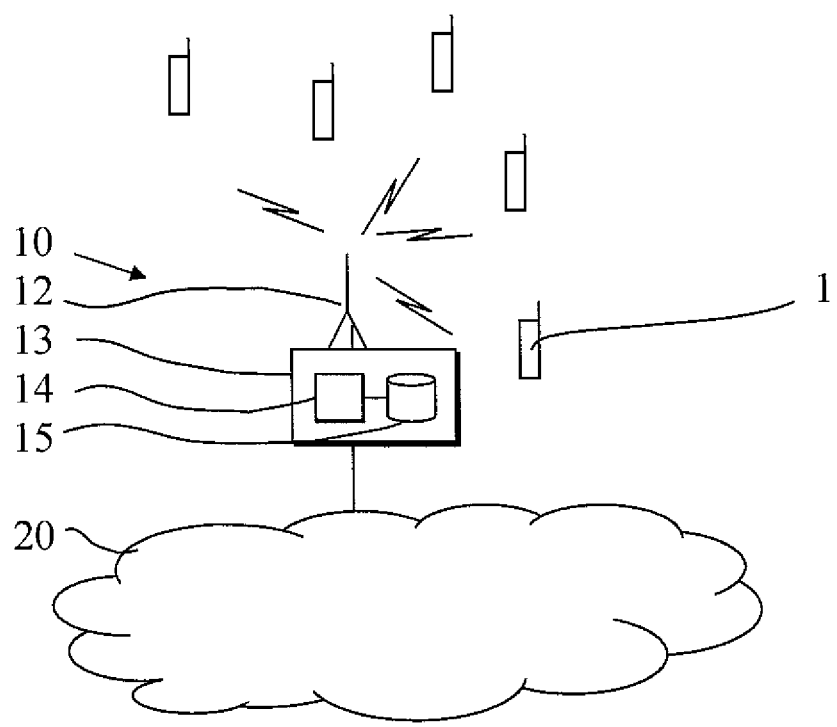
Fig. 1
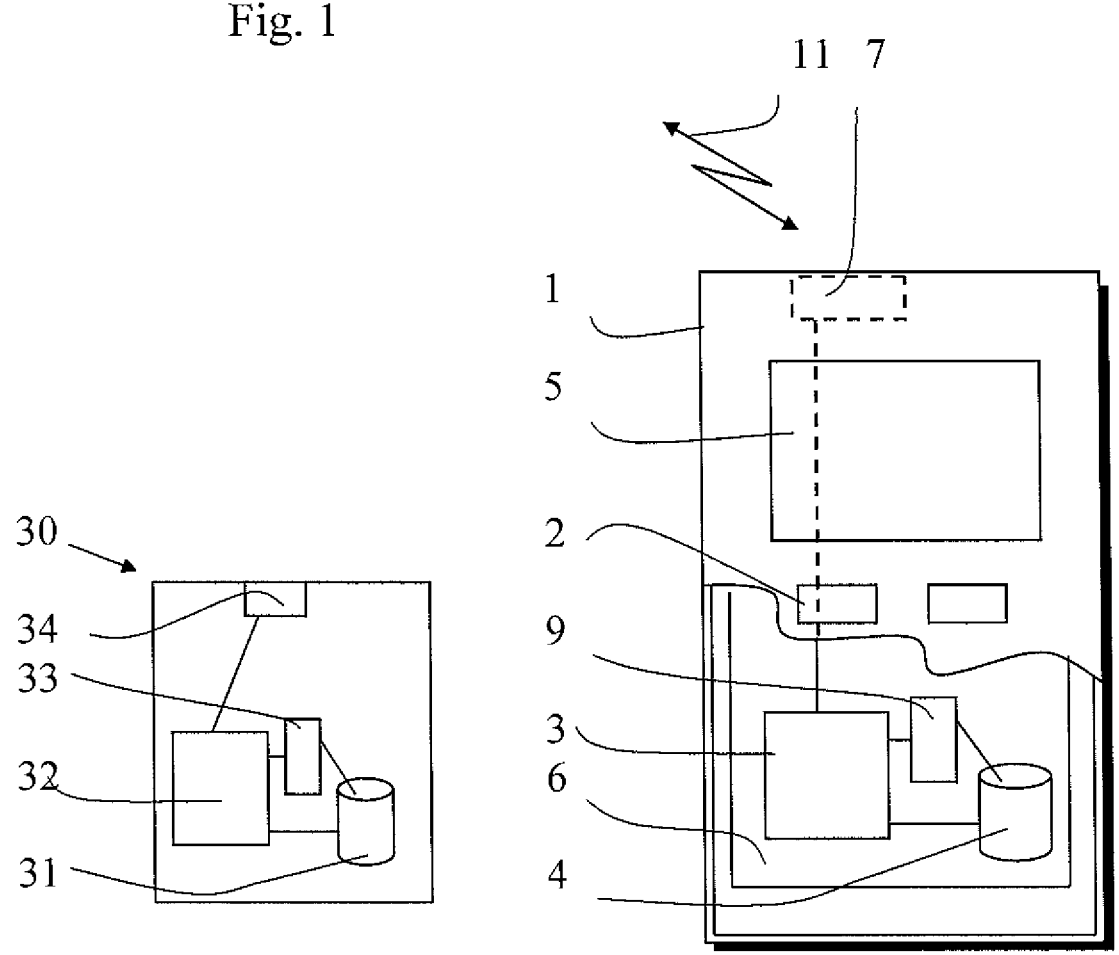
Fig. 3
Fig. 2

ACCESS CONTROL WITH PARTIAL SUPPORT FOR COMMUNICATIONS

RELATED APPLICATION

This application was originally filed as PCT Application No. PCT/EP2009/054982, filed Apr. 24, 2009.

The invention relates to communication devices, and more particularly to controlling communication devices accessing communication systems with different frequency settings.

A communication system can be seen as a facility that enables communication sessions between two or more entities. For example, mobile communication systems provide for communications on wireless interfaces between mobile communication devices and/or other stations. The communications may comprise, for example, communication of voice, electronic mail (email), text message, multimedia, other data and so on. Users may thus be offered and provided numerous services via their communication devices. Non-limiting examples of these services include two-way or multi-way calls, data communication or multimedia services or simply an access to a data communications network system, such as the Internet. A user who has accessed a system may also be provided broadcast or multicast content. Non-limiting examples of the content include downloads, television and radio programs, videos, advertisements, various alerts and other information.

A communication system can be provided for example by means of a communication network and one or more compatible communication devices. The communication network may be a large network proving nationwide cover, continent wide cover or even global cover, or be provided by a local network. In a wireless communication system at least a part of communications between at least two stations occurs over a wireless link. Examples of wireless systems include public land mobile networks (PLMN), satellite based communication systems and different wireless local networks, for example wireless local area networks (WLAN). A user can access the communication system via an access system thereof. The access system can be provided, for example, by a base station or a group of base stations and associated controllers. The wireless systems can typically be divided into cells provided by the access systems, and are therefore often referred to as cellular systems.

A feature of the wireless systems is that they offer mobility for the users thereof. The user may move from a cell or other access system to another in a network. A mobile user is also typically allowed to enter another network, for example a network operated by another operator in another country than is the network he subscribes to. This is often referred to as roaming.

A user can access a communication system by means of an appropriate communication device. A communication device of a user is often referred to as user equipment (UE). A communication device is provided with an appropriate signal receiving and transmitting apparatus for enabling communications, for example enabling access to a communication network or communications directly with other users. The communication device may receive and/or transmit on one or more channels provided by another station, for example a base station.

The communication system and associated devices typically operate in accordance with a given standard and/or specifications which set out what the various entities associated with the system are permitted to do and how that should be achieved. For example, the standard or specification may define if a communication device is provided with a circuit switched carrier service or a packet switched carrier service or both, and how the carriers between the various entities are configured and how the resources are to be accessed and used. Communication protocols and/or parameters which shall be used for the connection are also typically defined. For example, the manner how the communication device can use resources provided by the communication system and how communication shall be implemented between communicating devices, the elements of the communication network and/or other communication devices is typically based on predefined communication protocols. Thus the manner devices can communicate and how resources can be used is relatively strictly defined.

Use of resources such as frequency bands, i.e. predefined ranges of frequencies, is thus well defined. For example, third generation partnership project (3GPP) has defined a standard where particular radio frequency (RF) specifications define how radio frequency bands are to be used by communication devices accessing a communication system. Another example that can be given herein relates to the Long Term Evolution (LTE) specifications where, for example, user equipment (UE) RF specification TS 36.101 version 8.5.0 of March 2009 defines that different radio frequency requirements can be used for different frequency bands. An example of a band specific requirement is the ability to access all frequency channels in the band. Also some radio frequency performance related parameters may be band specific. For example, receiver reference sensitivity may be defined separately for each band. Other non-limiting examples of parameters that can have different requirement for different frequency bands are transmitter spurious emissions and receiver blocking.

If a communication device satisfies all requirements for a frequency band, it is said to support that band. For example, in a 3GPP user equipment type approval procedure a communication device wanting to access a system can be tested in all bands that it supports. In accordance with a possibility for providing the testing a network signals a system information block (SIB) information element that includes a band indicator. A communication device is then allowed to enter and transmit in the network only if it fully supports the indicated band as the current standards and/or specification limit the network entry to those frequency settings, for example frequency bands, that a communication device fully supports. Information indicative of the settings, for example a system information block (SIB) received from the network includes only one band number. A communication device is not supposed to enter a network if it does not fully support the indicated setting or settings.

It is noted that the above discusses only examples, and the issues are not limited to any particular communication environment, standard, specification and so forth, but may occur in any appropriate communication system where a communication device using a first type of frequency settings can attempt to access a system where different settings are used.

Embodiments of the invention aim to address one or several of the above issues.

In accordance with an embodiment there is provided a control apparatus, the control apparatus being configured to allow a communication device supporting a first frequency setting to enter a system providing a communications facility based on a second frequency setting, wherein the first frequency setting provides only a partial support for communications in the system.

In accordance with another embodiment there is provided a method comprising allowing a communication device supporting a first frequency setting to enter a system providing a communications facility based on a second frequency setting, wherein the first frequency setting provides only a partial support for communications in the system.

In accordance with an embodiment the apparatus allowing the communication device too enter can be further configured to sent frequency setting information. The control apparatus can be operationally coupled to an enhanced NodeB.

In accordance with another embodiment, there is provided a control apparatus for a communication device, the apparatus being configured to determine based on frequency setting information received from a system providing a communications facility if it is possible to transmit to the system based on a first frequency setting supported by the communication device, wherein the system provides the communications facility based on a second frequency setting and the first frequency setting provides only a partial support for communications in the system.

In accordance with another embodiment, there is provided a method comprising receiving from a system frequency setting information at a communications device supporting a first frequency setting, wherein the system provides a communications facility based on a second frequency setting and the first frequency setting provides only a partial support for communications in the system, and determining based on the frequency setting information if sending from the communication device to the system is possible.

In accordance with an embodiment the first frequency setting may provide support for communication on a frequency band and the second frequency setting may define communications on at least one different frequency band. The second frequency setting can be used to define communications on a main frequency band and at least one additional frequency band. The frequency settings may comprise radio frequency requirements for relevant radio frequency bands. The frequency setting information may comprise an indication of at least one frequency band provided by the system. The frequency setting information may comprise an indication of a main and/or at least one additional frequency band provided by the system.

In accordance with an embodiment frequency setting information is communicated by the relevant apparatus such that the information is available for the communication device after the communication device has entered the service area of the system. Sending or receiving the frequency setting information may occur automatically after the communication device enters the service area of the system. The frequency setting information may be communicated in a system information block.

The control apparatus for the communication device may be configured to determine based on the frequency setting information that at least one frequency band provided by the system is supported by the communication device, and to allow transmission on a random access channel to the system in response to such determination.

A control apparatus may be configured to receive a transmission from a communication device and to determine the level of support provided by the communication device for the second frequency setting based on the received transmission and to control communications by the communication device based on determination. In certain embodiment that the transmission may be received on a random access channel. Frequency bands supported by the communication device cam be determined based on the received transmission. Limitations on communications by the communication device may be decided after determining capabilities thereof based on the received transmission. Transmission scheduling may be controlled based on the determination. The control apparatus may be configured to use a limited channel range. Alternatively, or in addition, the control apparatus may allocate resource blocks that are away from potential blocking signals. The control apparatus may also avoid use of band edges and/or allocate frequency or frequencies that is/are away from critical emission area or areas. Control may be provided is based on either full support capability or partial support capability.

Different sets of channel numbers may be used for different communication devices.

In accordance with yet another embodiment there is provided a control apparatus comprising means for allowing a communication device supporting a first frequency setting to enter a system providing a communications facility based on a second frequency setting, wherein the first frequency setting provides only a partial support for communications in the system.

In accordance with still yet another embodiment there is provided a control apparatus comprising means for determining based on frequency setting information received from a system providing a communications facility if it is possible to transmit to the system based on a first frequency setting supported by a communication device, wherein the system provides the communications facility based on a second frequency setting and the first frequency setting provides only a partial support for communications in the system.

A computer program comprising program code means adapted to perform one or more of the herein disclosed methods is also provided. The computer executable program code components can be stored on a computer-readable storage medium.

Various other aspects and further embodiments are also described in the following detailed description and in the attached claims.

The invention will now be described in further detail, by way of example only, with reference to the following examples and accompanying drawings, in which:

FIG. 1 shows an example of a communication system wherein below described examples of the invention may be implemented;

FIG. 2 shows an example of a communication device;

FIG. 3 shows an example of a controller for a base station;

Figure 4:
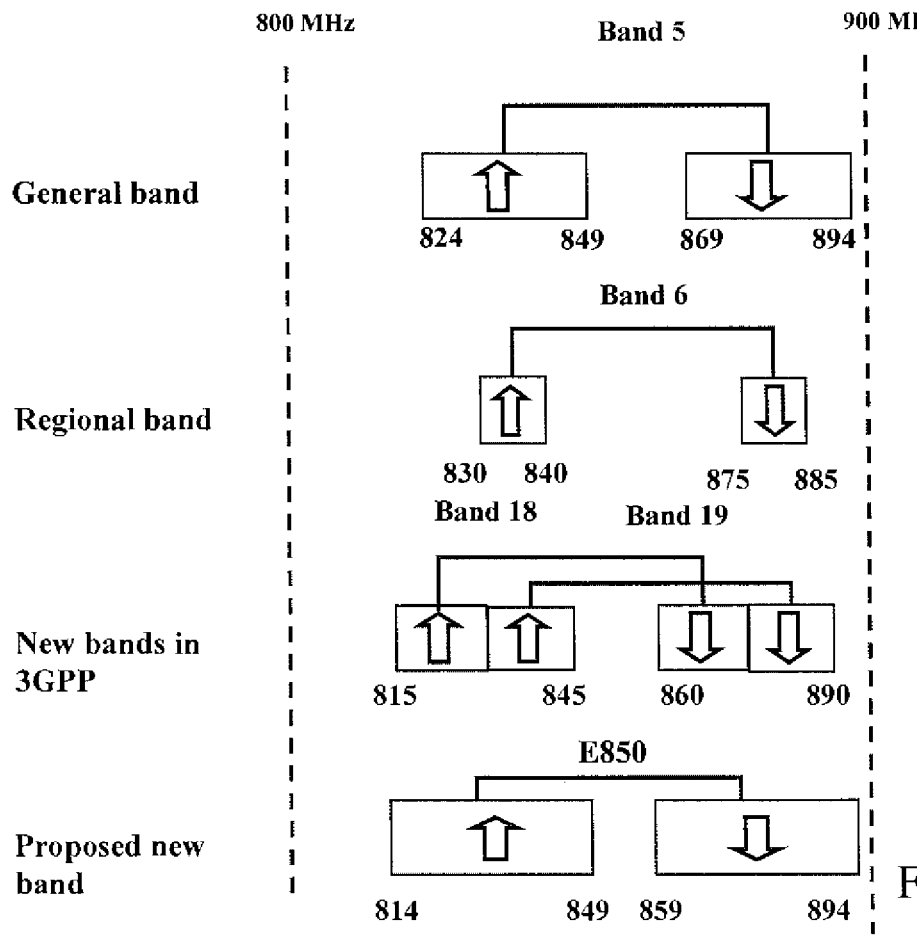
FIG. 4 shows an example of overlapping frequency bands.

In the following certain exemplifying embodiments are explained with reference to wireless or mobile communication systems serving mobile communication devices. Before explaining in detail the certain exemplifying embodiments, certain general principles of a wireless communication system and mobile communication devices are briefly explained with reference to FIGS. 1 and 2 to assist in understanding the technology underlying the described examples.

A communication device can be used for accessing various services and/or applications provided via a communication system. In wireless or mobile communication systems a wireless interface can be provided between mobile communication devices 1 and an appropriate access system 10.

It is noted that although only one access system 10 is shown in FIG. 1, typically a number of access systems would be provided.

A communication device can be used for accessing various services and/or applications through the communication system. A mobile communication device 1 is typically provided wireless access via at least one base station 12 or similar wireless transmitter and/or receiver node of the access system. A base station site can provide one or more cells of the plurality of cells of a cellular communication system. A base station can be configured to provide a cell, but can also provide, for example, three sectors, each sector providing a cell. Each mobile communication device 1 and base station may have one or more radio channels open at the same time and may receive signals from more than one source.

A base station is typically controlled by at least one appropriate controller so as to enable operation thereof and management of mobile communication devices in communication with the base station. The control apparatus can be interconnected with other control entities. In FIG. 1 the controller is shown to be provided by block 13. A control apparatus is typically provided with memory capacity 15 and at least one data processor 14. It shall be understood that the control apparatus and functions may be distributed between a plurality of controller units.

Non-limiting examples of appropriate access nodes are a base station of a cellular system, for example what is known as NodeB or enhanced Node B (eNB) in the vocabulary of the 3GPP specifications. Other examples include base stations of systems that are based on technologies such as wireless local area network (VVLAN) and/or WiMax (Worldwide Interoperability for Microwave Access).

The communication devices 1 can access the communication system based on various access techniques, such as code division multiple access (CDMA), or wideband CDMA (WCDMA). The latter technique is used by communication systems based on the third Generation Partnership Project (3GPP) specifications. Other examples include time division multiple access (TDMA), frequency division multiple access (FDMA), space division multiple access (SDMA) and so on. An example of the more recent developments in the standardization is the long-term evolution (LTE) of the Universal Mobile Telecommunications System (UMTS) radio-access technology that is being standardized by the $3^{rd}$ Generation Partnership Project (3GPP). A further development of the LTE is referred to as LTE-Advanced.

In FIG. 1 example the base station node 12 is connected to a wider communications network 20. Although not shown, a gateway function may also be provided to connect to another network via the network 20. The other network may be any appropriate network, for example another communication network, a packet data network and so on. A communication system may thus be provided by one or more interconnect networks and the elements thereof, and one or more gateways may be provided for interconnecting various networks.

FIG. 2 shows a schematic, partially sectioned view of a communication device 1 that can be used for communication with a communication system. An appropriate mobile communication device may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like. A mobile communication device may be used for voice and video calls, for accessing service applications and so on. The mobile device 1 may receive signals over an air interface 11 via appropriate apparatus for receiving and may transmit signals via appropriate apparatus for transmitting radio signals. In FIG. 2 a transceiver is designated schematically by block 7. The transceiver may be provided for example by means of a radio part and associated antenna arrangement. The antenna arrangement may be arranged internally or externally to the mobile device.

A mobile device is also typically provided with at least one data processing entity 3, at least one memory 4 and other possible components 9 for use in software aided execution of tasks it is designed to perform, including control of access to and communications with access systems. The data processing, storage and other relevant control apparatus can be provided on an appropriate circuit board and/or in chipsets. This feature is denoted by reference 6. The control apparatus can be configured to process frequency setting information received by a roaming communication device from a communication system.

In accordance with an example a determination can be made if it is possible to sent signals to the communication system based on a first frequency setting supported by the communication device in instances where the communication system provides a communications facility based on a second frequency setting and the first frequency setting provides only a partial support for communication in the communication system. The frequency settings may comprise radio frequency requirements for relevant radio frequency bands. The first frequency setting may provide support for communication on a frequency band and the second frequency setting may be used to define communications on at least one different frequency band. For example, the second frequency setting may be used define communications on a main frequency band and at least one additional frequency band. A control apparatus that is suitable for a communication device may comprise any appropriate means for determining, based on frequency setting information received from a system providing a communications facility, if it is possible to transmit to the system based on a first frequency setting supported by a communication device.

The user may control the operation of the mobile device by means of a suitable user interface such as key pad 2, voice commands, touch sensitive screen or pad, combinations thereof or the like. A display 5, a speaker and a microphone are also typically provided. Furthermore, a mobile communication device may comprise appropriate connectors (either wired or wireless) to other devices and/or for connecting external accessories, for example hands-free equipment, thereto.

FIG. 3 shows an example of a control apparatus 30 for a communication system, for example the access system of FIG. 1. The control apparatus 30 can be arranged to provide control on communications by roaming mobile communication devices that have entered the area of the system. The control apparatus 30 is configured to allow a communication device supporting a first frequency setting to enter the system providing a communications facility for communication devices based on a second frequency setting also in instances where the first frequency setting provides only a partial support for communications in the system. For this purpose the control apparatus comprises at least one memory 31, at least one data processing unit 32, 33 and an input/output interface 34. Via the interface the control apparatus can be coupled to a receiver and a transmitter of the system, for example a base station antenna, so that it can receive/transmit a transmission from/to the communication device. Based on the received signal the control apparatus can determine the level of support provided by the communication device for the second frequency setting. Control on communications by the communication device can then be based on this determination. The control apparatus may, for example, decide on limitations on the communication device based on the determined capabilities thereof. The control apparatus may also provide transmission scheduling based on the determination.

Figure 5:
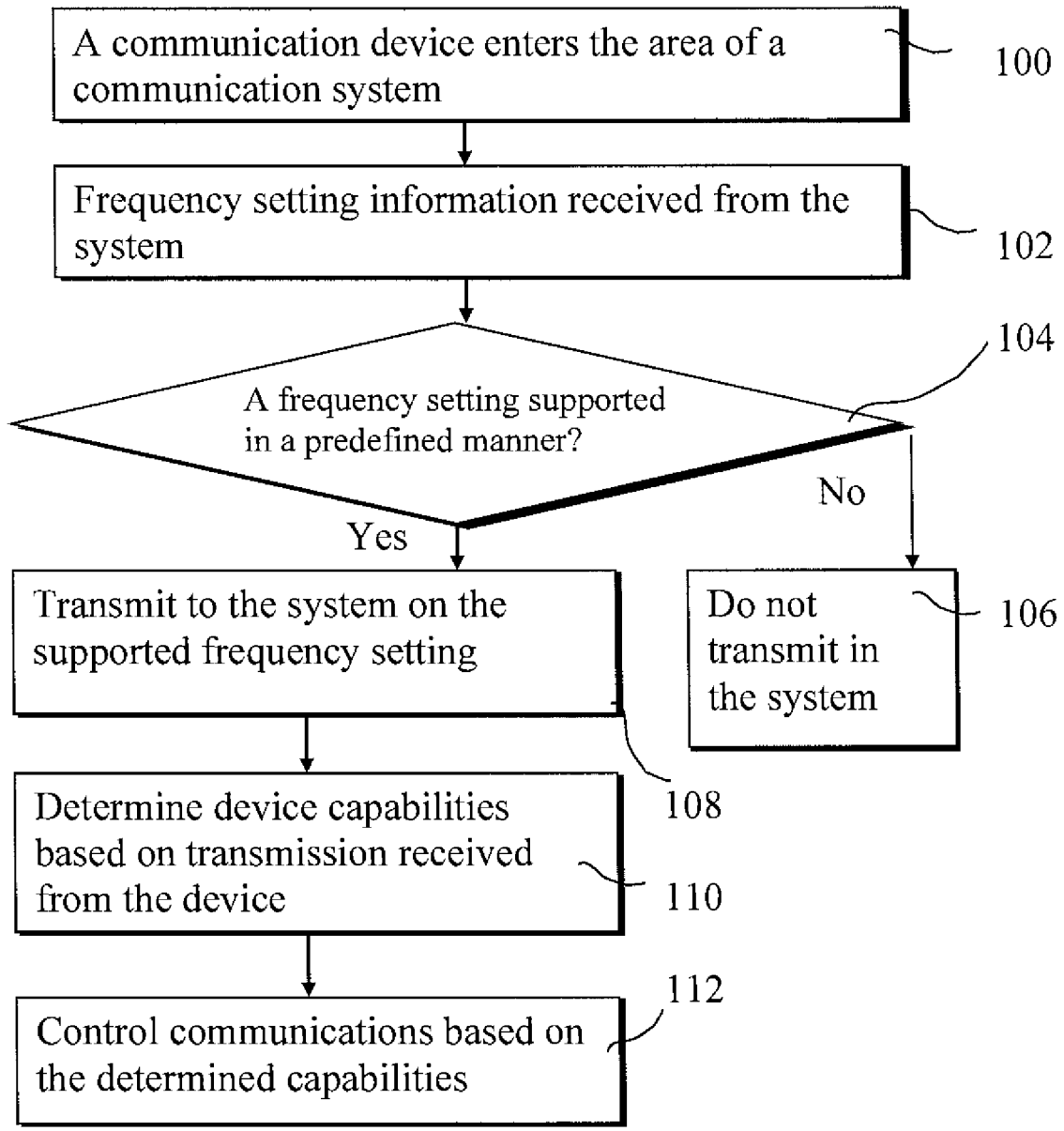

The control apparatus 30 can be configured to execute an appropriate software code to provide the control functions as explained below in more detail. More detailed examples for different control functions based on frequency settings are given in the below explained embodiments. In addition to the specific examples explained herein, a suitable control apparatus may comprise any appropriate means that can be used for allowing a communication device supporting a first frequency setting to enter a system providing a communications facility based on a second frequency setting An example how to provide control for a situation where a communication device can communicate in at least one of overlapping frequency bands will be described below with reference to the flowchart of FIG. 5. Before explaining the details of this embodiment, however, a few examples of situations where overlapping bands exist are given. An example of overlapping frequency bands that can be presented with reference to the 3GPP is shown in FIG. 4, and will be discussed first to clarify the underlying situation of this embodiment. At the present, there are 17 frequency bands defined in the 3GPP and the number of bands is still increasing. This is illustrated in the lower part of FIG. 4, see the new 3GPP bands 18 and 19 and the proposed new E850 band for global roaming. For this kind "global roaming band" it can be specified that for roaming purposes a communication device is allowed to entry for example a band 5 communication system if the communication device is specified to be E850 band compatible. Overlapping bands or otherwise close bands may, however, have different radio frequency (RE) requirements. In some cases a communication device, for example a mobile user equipment (UE), might be able to function in two or more frequency bands but it does not necessarily meet all RF requirements in at least one of the bands without additional filtering. Additional filtering may add to the complexity of the device. It may also decrease RF performance in general because of more complex switching that may increase loss in some or even all of the frequency bands in the area.

Another example is 700 MHz band where one proposal is to align Asian 700 MHz bands such that those would overlap with North American bands but would not be the same bands. Thus it is likely that there will be several overlapping frequency bands in this frequency area. However, due to different limitations in different regions such as the North America/USA, Europe and Asia the bands are not exactly the same and thus a communication device may face different requirements in different regions. Still using the 3GPP as an example, in the USA band 17 is fully inside band 12, but it has a tighter blocking requirement than band 12. In practice band 12 compatible communication device should most of the time work fine in band 17 network because the tighter blocking performance is needed only occasionally, and this can be the case only in a limited geographical area. However, the current 3GPP specifications prevent a band 12 compatible communication device to enter the band 17 network. Adding band 17 support in a band 12 compatible communication device may increase the complexity of the device.

Thus there can be globally several frequency bands that are partially overlapping. It would be advantageous if communication devices could have a roaming capability between these bands. However, building support for global bands is getting increasingly complex. To address this, in accordance with an embodiment shown in FIG. 5 a communication device roaming at 100 into the area of a communication system is allowed to enter into communications in the system at 108 even if it is known that the device can provide only a limited or partial radio frequency (RF) support. More particularly, a communication device that supports only a first frequency setting is allowed to enter the system providing a communications facility based on a second frequency setting even in instances where the first frequency setting provides only a partial support for communications in the system.

In accordance with an embodiment the communication device can receive at 102, after having entered the area of the system at 100, frequency setting information from the system. It can then be determined at 104, based on the frequency setting information, if it a frequency setting indicated by the frequency setting information is supported by the communication device in a predefined manner and if it is thus possible to communicate by the communication device in the communication system. If the determination is that the communication device does not provide appropriate support, nothing is sent at 106 by the communication device. However, if the predefined support is determined to exist, the communication device can transmit to the system at 108 on the supported frequency setting.

This can be used to facilitate solutions where roaming communication devices are allowed to enter into a communication system even when it is known that there is a possibility that some of the communication devices may have certain RF performance limitations.

Also, other restrictions might be set for the roaming devices. For example, limits to the number of RF limited communication devices that are allowed to access the network at a given time and/or limits to the time and/or location when any such access is allowed may be defined. The operator may also define different groups of communications devices (e.g. based on priority classes or communication devices that subscribe to certain operators) with different acceptable limitations. It can also be defined on a case by case basis if a device that entered into the area of a communication system is allowed to communicate in the system. The limitations may be set and varied dynamically. For example, the limitations may depend on time, load, quality requirements and/or on another such factor.

Acceptable limitations and any conditions that may be considered as appropriate can be defined beforehand. For example, a network operator may define which limitations are acceptable for all roaming devices, or a predefined group of roaming devices.

In accordance with an embodiment information regarding the bands provided by a communication system is sent to a communication device always after it has entered the area of the system. For example, the information can be broadcast on a common channel provided by the system so that any communication device that is able to listen that channel can receive the information. According to a possibility the information is sent in a dedicated message to a particular communication device that has been detected as having entered the system.

The information can be sent to the communication device in the form of a frequency band indicator. For example, in a LTE based system a second band indicator may be added in a system information block (SIB). For example, 3GPP specification 36.331, version 8.5.0 of March 2009 titled 'Technical Specification Group Radio Access Network; Evolved Universal Terrestrial Radio Access (E-UTRA), Radio Resource Control (RRC); Protocol specification' defines on pages 98 and 99 use of a 'freqBandIndicator' element in the System Information Block (SIB) Type1 message for providing indication of the one frequency band supported by the system. The second indicator element can be added in the SIB, and might be called, for example, 'secondaryFreqBandIndicator' element. That is, the system information block message can be expanded to include 'freqBandIndicator' and 'secondaryFreqBandIndicator' elements. Further elements for further bands may be added in similar fashion.

The communication device can then receive the frequency setting information included in the system information block (SIB) from the communication system at 102. If the control apparatus of the device determines that the device supports at least one of the indicated bands at 104 it can communicate on the wireless interface to the communication system at 108. For example, the communication device can send on a random access channel (RACH) provided by the communication system. Thus the communication device roaming into an area of a communication system can be informed of the main and secondary frequency bands, and any further bands, that are available for communications in that area. The communication device can determine from the indicators on which terms the different bands are available. This can be used to determine how well each band might operate if chosen as the communication device can be made aware that there might be different limitations in the different bands. The communication device may then take appropriate control actions based on this, for example not even attempt to have a packet data connection on certain or any bands.

Sending of the indicators also allows the system, for example a base station system provided by an enhanced node B (eNB), to control already the sending on the random access channel (RACH). This is so because leaving out the secondary indicator from the SIB can be used to prevent the communication device from sending anything if it does not fully support the main band.

After the communication device sends the RACH the communication system can determine at 110 from the transmission from the communication device which one of the available bands the communication device supports. A determination can also be made in view of the level of support provided for the various bands, or at least one band. Control of the communication device can then be based on the full capability or partial capability at 112.

In accordance with an embodiment the possibility of communications by limitedly supporting communication devices is provided by adding specific cases as exceptions in a standard, specification and/or protocol that defines the operational aspect of a communication system. For example, it can be defined that if band 17 is signaled then also a band 12 communication device can send on the random access channel (RACH). In that case a communication device supporting only band 12 can be allowed to send on the RACH of the system operating on band 17. The control apparatus of the communication system can decide on limitations for the communication device after having received signaling from the communication device and determined its capabilities based on the signaling.

Figure 6:
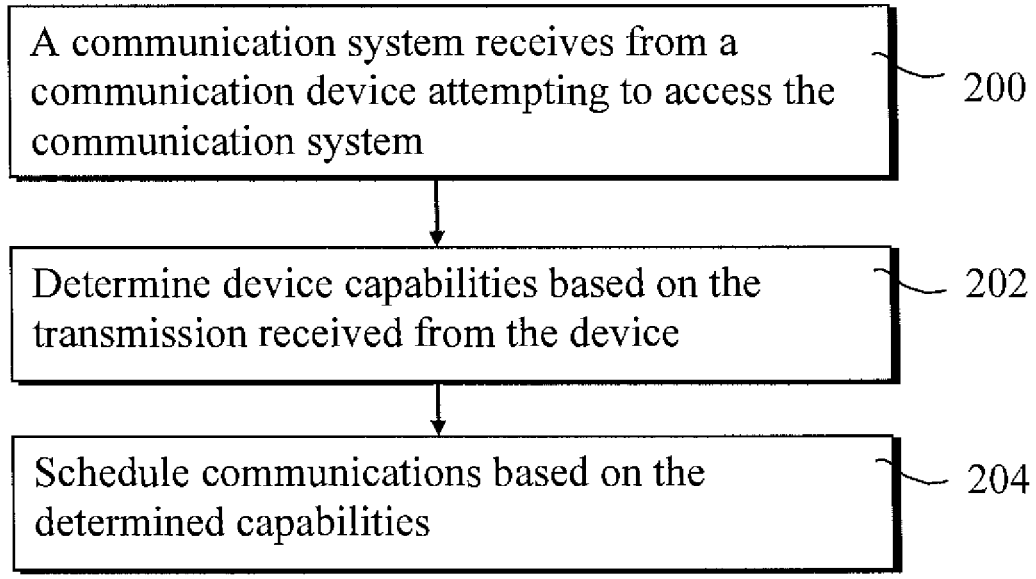
FIGS. 5 and 6 are flowcharts illustrating certain embodiments.

A communication system can utilize the information of capabilities of communication devices that have entered the service area thereof also otherwise. For example, information about RF capabilities of a communication device can be used in tasks such as scheduling. This embodiment is illustrated by FIG. 6. The capability information, for example supported band information of a communication device can be provided for a base station system when the communications device attempts to gain access to the system. At this stage the communication system can thus receive at 200 from the communication device. For example, a base station can receive access signaling on the RACH from the communication device. Based on the received signaling the base station and more particularly a control apparatus thereof can determine at 202 if the communication device supports its main band, a secondary band or any other band that may be available and/or any other information that might be useful in allocating resources for the communication device. The controller of the base station can also determine, based on this information, any limitations the communication device may have and can schedule further transmissions accordingly at 204.

The capability information can be utilized in a base station scheduler, for example an eNB scheduler or similar. The case where a communication device supports only a part of the channels but meets all other requirement can be applied in different systems and can be handled simply by keeping the roaming communication devices in a limited channel range covering said supported channels. In a more complex case, for example in a LTE based system, the scheduler can have more flexibility also inside a channel than it would have, for example, in systems that employ wideband code division multiple access (WCDMA) or are based on the GSM. For example, in a case where a roaming communication device has a limited blocking performance the access system can allocate resource blocks as far as possible from the potential blocking signals. In a case where a roaming communication device has limited receiver sensitivity the downlink allocation may be used to avoid band edge of the band because risk of poor sensitivity and thus possibility of poor reception is typically greater at the band edges. A limitation can also be set in view of transmission emissions. In that case the uplink frequency allocated for a communication device can be allocated further away from the critical emission area.

Currently the channel numbers are band specific, so the same channel center frequency can lead to a different channel number depending on the frequency band. Because of this an access system may need to use a different set of channel numbers if there are communication devices that are using different band numbers in the network. Different channel numbers may be provided in the communication device. In that case the network can send a channel number to the communication device that is based on a primary band. If the communication device supports a secondary band that has a different set of channel numbers it may map the number from the primary band to the secondary band. Another possibility is that the network sends different channel numbers to different communication devices based on the determined band support by the devices.

The data processing functions of the control apparatus for a communication system and for a communication device may be provided by means of one or more data processors. The described functions may be provided by separate processors or by an integrated processor. The data processing may be distributed across several data processing modules. A data processor may be provided by means of, for example, at least one chip. Appropriate memory capacity can also be provided in the relevant control apparatus. An appropriately adapted computer program code product or products may be used for implementing the embodiments, when loaded on an appropriate data processing apparatus, for example for including appropriate indications in a processor apparatus 13 associated with the base station 12 shown in FIG. 1 and/or for the determining operations in a data processing apparatus 3, 4 and 9 of the mobile communication device 1 of FIG. 2. The program code product for providing the operation may be stored on, provided and embodied by means of an appropriate carrier medium. An appropriate computer program can be embodied on a computer readable record medium. A possibility is to download the program code product via a data network.

The above described example embodiments may provide global roaming for a variety of communication devices without a need to build full band support into them. More roaming alternatives may be provided for a communication device design. A considerable range of frequencies might become available with a design or only a few different designs.

It is noted that whilst embodiments have been described in relation to communications system such as those based on the LTE and 3GPP based systems, similar principles can be applied to any other communication system where frequency bands are employed. Also, instead of communications between a base station and a communication device the communications may be provided directly between two or more communication devices. For example, this may be the case in application where no fixed equipment is provided but a communication system is provided by means of a plurality of user equipment, for example in adhoc networks. In such applications a first or controlling communication device that at least one another device wishes to communicate with can be seen as having the role of a communication system and the device attempting to communicate with the first device can be seen as a device that wants to communicate in the system provided by the first device. Therefore, although certain embodiments were described above by way of example with reference to certain exemplifying architectures for wireless networks, technologies and standards, embodiments may be applied to any other suitable forms of communication systems than those illustrated and described herein.

It is also noted herein that while the above describes exemplifying embodiments of the invention, there are several variations and modifications which may be made to the disclosed solution without departing from the spirit and scope of the present invention.

The invention claimed is:

1. An apparatus comprising:
at least one processor and at least one memory including a computer program code, wherein the at least one memory and the computer program code are configured to, with the at least one processor, cause the apparatus to at least:
receive, from a user equipment via a random access channel, a request to access and transmit using at least a first frequency setting defining at least a first radio frequency requirement for at least a first frequency band, the apparatus being configured to communicate via an air interface using at least a second frequency setting defining at least a second radio frequency requirement for at least a second frequency band, wherein the user equipment partially, rather than fully, supports communications using the second radio requirement of the apparatus, wherein the partial support is caused at least in part by the first radio frequency setting differing from the second frequency setting by at least having different radio frequency requirements due in part to the first frequency band partially overlapping in frequency with at least the second frequency band; and
based on a level of support provided by the first frequency setting for the second frequency setting used by the apparatus, allow the user equipment to access and to transmit to the apparatus using the first frequency setting.

2. An apparatus in accordance with claim 1, wherein the partial support is further caused in part due to filtering differences between the first frequency setting and the second frequency setting, and wherein the apparatus of claim 1 is further caused to at least:
send second frequency setting.

3. An apparatus in accordance with claim 1, wherein at least the second frequency band comprises a main frequency band and at least one additional frequency band.

4. An apparatus in accordance with claim 1, wherein the first frequency setting and the second frequency setting are specified in one or more cellular communications standards.

5. An apparatus in accordance with claim 1, wherein the apparatus is further caused to at least:
receive a transmission from the user equipment; and
determine the level of support provided by the user equipment for the second frequency setting based on the received transmission and control communications by the user equipment based on the determination.

6. An apparatus in accordance with claim 5, wherein the apparatus is further caused to at least:
receive the transmission on the random access channel; and
determine frequency bands supported by the user equipment based on the received transmission.

7. An apparatus in accordance with claim 5, wherein the apparatus is further caused to at least:
determine, based on the received transmission, one or more limits in a communications capability of the user equipment.

8. An apparatus in accordance with claim 5, wherein the apparatus is further caused to at least:
control transmission scheduling based on the determination.

9. An apparatus in accordance with claim 8, wherein the apparatus is further caused to at least:
use a limited channel range, allocate resource blocks that are away from potential blocking signals, avoid use of band edges, and/or allocate one or more frequencies that are away from critical emission area or areas.

10. An apparatus in accordance with claim 1, wherein the apparatus is further caused to at least:
use different sets of channel numbers for different user equipment.

11. An apparatus comprising:
at least one processor and at least one memory including a computer program code, wherein the at least one memory and the computer program code are configured to, with the at least one processor, cause the apparatus at least to:
receive, from a base station, a base station frequency setting, the base station frequency setting providing an indication of a communication facility provided by the base station via an air interface and defining communications in at least a first frequency band of the air interface; and determine, based on the base station frequency setting, whether the apparatus is allowed to transmit to the base station using an apparatus frequency setting defining at least a second radio frequency requirement for at least a second frequency band supported by the apparatus, wherein the apparatus partially, rather than fully, supports communications using the base station frequency setting requirements of the base station, wherein the partial support is caused at least in part by the apparatus frequency setting differing from the base station frequency setting by at least having different radio frequency requirements due in part to the second frequency band partially overlapping in frequency with at least the first frequency band.

12. An apparatus in accordance with claim 11, wherein at least the first frequency band comprises a main frequency band and at least one additional frequency band.

13. An apparatus in accordance with claim 11, wherein the base station frequency setting and the apparatus frequency setting are specified in one or more cellular communications standards.

14. An apparatus in accordance with claim 11, wherein at least the first frequency band comprise at least two frequency bands.

15. An apparatus in accordance with claim 11, wherein the apparatus is further caused to at least:
determine frequency band supported by the user equipment; and
allow, based at least in part on the determination, transmission on the random access channel to the base station in response to the determination.

16. A method comprising:
receiving, from a base station, a base station frequency setting, the base station frequency setting providing an indication of a communication facility provided by the base station via an air interface and defining communications in at least a first frequency band of the air interface; and
determine, based on the base station frequency setting, whether the apparatus is allowed to transmit to the base station using an apparatus frequency setting defining at least a second radio frequency requirement for at least a second frequency band supported by the apparatus, wherein the apparatus partially, rather than fully, supports communications using the base station frequency setting requirements of the base station, wherein the partial support is caused at least in part by the apparatus frequency setting differing from the base station frequency setting by at least having different radio frequency requirements due in part to the second frequency band partially overlapping in frequency with at least the first frequency band.

17. A method in accordance with claim 16, wherein the base station frequency setting defines communications on a main frequency band and at least one additional frequency band.

18. A method in accordance with claim 16, wherein the base station frequency setting comprises an indication of at least two frequency bands.

19. A method in accordance with claim 16, wherein the communications occurs on a random access channel to the base station.

20. An apparatus comprising:
at least one processor and at least one memory including a computer program code, wherein the at least one memory and the computer program code are configured to, with the at least one processor, cause the apparatus at least to:
send, over an air interface, a transmission to a base station using a first frequency setting, wherein the first frequency setting defining at least a first radio frequency requirement for at least a first frequency band;
receive, over the same air interface, second frequency setting from the base station, the base station configured to communicate over the same air interface using a second frequency setting, wherein the second frequency setting defining at least a second radio frequency requirement for at least a second frequency band;
determine, based on the received second frequency setting, whether the apparatus supports communications over the same air interface using the second frequency setting;
communicate with the base station using the first frequency setting when the user equipment fails to support communication using the second frequency setting but the apparatus partially, rather than fully, supports communications using the second frequency setting requirements of the base station, wherein the partial support is caused at least in part by the first frequency setting differing from the second frequency setting by at least having different radio frequency requirements due in part to the second frequency band partially overlapping in frequency with at least the first frequency band; and
controlling the communication based on the determination.

21. An apparatus comprising:
at least one processor and at least one memory including a computer program code, wherein the at least one memory and the computer program code are configured to, with the at least one processor, cause the apparatus to at least:
receive, at the apparatus, a transmission from a user equipment that communicates via a random access channel using a first frequency setting defining at least a first radio frequency requirement for at least a first frequency band;
determine, based on the received transmission, whether the user equipment supports communications using a second frequency setting defining at least a second radio frequency requirement for at least a second frequency band, wherein the user equipment partially, rather than fully, supports communications using the second radio requirements of the apparatus, wherein the partial support is caused at least in part by the first radio frequency setting differing from the second frequency setting by at least having different radio frequency requirements due in part to the first frequency band partially overlapping in frequency with at least the second frequency band;
allow, in response to the user equipment failing to support communication using the second frequency setting but having partial support for the second frequency setting, the user equipment to communicate with the apparatus; and control, based on the determination, communication by the user equipment.

\* \* \* \* \*

UNITED STATES PATENT AND TRADEMARK OFFICE
CERTIFICATE OF CORRECTION

| | | |
|---|---|---|
| PATENT NO. | : 11,553,490 B2 | Page 1 of 1 |
| APPLICATION NO. | : 13/266058 | |
| DATED | : January 10, 2023 | |
| INVENTOR(S) | : Pesola et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 362 days.

Signed and Sealed this
Fourteenth Day of January, 2025

Derrick Brent
*Acting Director of the United States Patent and Trademark Office*